US011371939B2

United States Patent
Everett et al.

(10) Patent No.: US 11,371,939 B2
(45) Date of Patent: Jun. 28, 2022

(54) SYSTEM AND METHOD OF PRODUCT AUTHENTICATION

(71) Applicant: Arylla Inc., Waterloo (CA)

(72) Inventors: Perry Everett, Kitchener (CA); Benjamin Rasera, Kitchener (CA); Graham Thomas, Waterloo (CA)

(73) Assignee: Arylla Inc., Waterloo (CA)

( * ) Notice: Subject to any disclaimer, the term of this patent is extended or adjusted under 35 U.S.C. 154(b) by 0 days.

(21) Appl. No.: 17/140,585

(22) Filed: Jan. 4, 2021

(65) Prior Publication Data

US 2021/0148819 A1 May 20, 2021

Related U.S. Application Data

(63) Continuation of application No. 16/333,442, filed as application No. PCT/IB2017/055602 on Sep. 15, 2017, now Pat. No. 10,883,935.

(Continued)

(51) Int. Cl.
*G01N 21/64* (2006.01)
*G06K 19/06* (2006.01)
(Continued)

(52) U.S. Cl.
CPC ....... *G01N 21/6428* (2013.01); *G01N 21/645* (2013.01); *G01N 21/6456* (2013.01);
(Continued)

(58) Field of Classification Search
CPC ............. G01N 21/6428; G01N 21/645; G01N 21/6456; G01N 2021/6419;
(Continued)

(56) References Cited

U.S. PATENT DOCUMENTS 6,487,271 B1  11/2002  Laurent
7,288,924 B2  10/2007  Trandafir et al.
(Continued)

FOREIGN PATENT DOCUMENTS

CA   2231862       3/1997
CA   2350414 A1    7/2000
(Continued)

OTHER PUBLICATIONS

Written Opinion, dated Jan. 9, 2018, by ISA/CA, re PCT International Patent Application No. PCT/US2017/055602.
(Continued)

*Primary Examiner* — David P Porta
*Assistant Examiner* — Fani Polyzos Boosalis
(74) *Attorney, Agent, or Firm* — Standley Law Group LLP; Stephen L. Grant; Kenny W. Pung

(57) ABSTRACT

A method and system are provided. The method involves generating a plurality of nanoparticles, isolating fluorescent nanoparticles, embedding the fluorescent nanoparticles in a resin and applying the resin on a product. The system is for product authentication and includes a light source, fluorescence nanoparticles, a detector and a resin for applying on a product. Furthermore, a non-transitory computer readable medium encoded with codes is provided to direct the system to carry out the method.

17 Claims, 8 Drawing Sheets

Related U.S. Application Data

(60) Provisional application No. 62/395,079, filed on Sep. 15, 2016.

(51) Int. Cl.
  *G06Q 30/06* (2012.01)
  *G06F 7/00* (2006.01)
  *G06Q 30/02* (2012.01)
  *G07C 11/00* (2006.01)

(52) U.S. Cl.
  CPC ............... *G06F 7/00* (2013.01); *G06K 19/06* (2013.01); *G06K 19/06084* (2013.01); *G06Q 30/0241* (2013.01); *G06Q 30/0609* (2013.01); *G07C 11/00* (2013.01); *G01N 2021/6419* (2013.01); *G01N 2201/0627* (2013.01); *G06K 2019/06225* (2013.01)

(58) Field of Classification Search
  CPC .. G01N 2201/0627; G06F 7/00; G06K 19/06; G06K 19/06084; G06K 2019/06225; G06Q 30/0241; G06Q 30/0609; G07C 11/00

See application file for complete search history.

(56) References Cited

U.S. PATENT DOCUMENTS

| | | | |
|---|---|---|---|
| 7,394,997 B2 | 7/2008 | Mei et al. | |
| 7,549,592 B2 | 6/2009 | Iftime et al. | |
| 7,641,120 B2 | 1/2010 | Iftime et al. | |
| 7,795,598 B2 | 9/2010 | De Lamberterle | |
| 7,938,331 B2 | 5/2011 | Brock et al. | |
| 7,995,196 B1* | 8/2011 | Fraser | G06K 9/00288 356/71 |
| 8,458,475 B2* | 6/2013 | Mercolino | G06K 7/12 713/176 |
| 8,474,714 B1 | 7/2013 | Grant et al. | |
| 2004/0172537 A1 | 9/2004 | Baus et al. | |
| 2005/0213790 A1 | 9/2005 | Rhoads et al. | |
| 2006/0152706 A1 | 7/2006 | Butland | |
| 2006/0293409 A1 | 12/2006 | Sanchez et al. | |
| 2007/0069153 A1 | 3/2007 | Pai-Paranjape et al. | |
| 2009/0007815 A1 | 1/2009 | Hampden-Smith et al. | |
| 2009/0045360 A1 | 2/2009 | Wosnick et al. | |
| 2009/0116753 A1 | 5/2009 | Midgley et al. | |
| 2013/0022238 A1 | 1/2013 | Wood et al. | |
| 2013/0087620 A1 | 4/2013 | Sharma et al. | |
| 2013/0173383 A1 | 7/2013 | Sharma et al. | |
| 2014/0119615 A1 | 5/2014 | Mercolino et al. | |
| 2014/0233842 A1 | 8/2014 | Gardner et al. | |
| 2015/0014586 A1 | 1/2015 | Liu et al. | |
| 2015/0038578 A1 | 1/2015 | Pawlik et al. | |
| 2015/0213349 A1 | 7/2015 | Downing | |
| 2016/0098581 A1 | 4/2016 | Ascencio et al. | |
| 2016/0162907 A1 | 6/2016 | Liu et al. | |
| 2016/0199931 A1 | 7/2016 | Sjodin et al. | |

FOREIGN PATENT DOCUMENTS

| | | |
|---|---|---|
| CA | 2607687 A1 | 4/2008 |
| CN | 102002365 A | 4/2011 |
| JP | 2011112877 A | 6/2011 |
| WO | 2010012046 A1 | 2/2010 |
| WO | 2013066202 A1 | 5/2013 |
| WO | 2015008256 A1 | 1/2015 |
| WO | 2016057956 A1 | 4/2016 |

OTHER PUBLICATIONS

International Search Report, dated Jan. 9, 2018, by ISA/CA, re PCT International Patent Application No. PCT/US2017/055602.
WIPO/IB, International Preliminary Report on Patentability, dated Mar. 28, 2019, re PCT International Patent Application No. PCT/IB2017/055602.

* cited by examiner

SYSTEM AND METHOD OF PRODUCT AUTHENTICATION

FIELD

The present specification relates generally to product authentication, and specifically to product authentication using markings.

BACKGROUND

Production and distribution of counterfeit products represents an emerging global crisis, which results in a substantial amount of lost revenue for all parties involved. This problem affects nearly every commercial sector and can have consequences for unsuspecting consumers. Legitimate brand and intellectual property owners also suffer due to brand erosion and financial losses. Over the last decade, counterfeiters have become more sophisticated and have expanded counterfeiting activities to include high value products, such as anti-cancer drugs. Large international crime syndicates have also started to establish counterfeiting divisions within their own organizations due to the high profit potential and comparatively lesser penalties compared to other illegal activities such as trafficking narcotics. Ultraviolet responsive inks and holography have been used to provide a means to verify authenticity of products; however, counterfeiters constantly develop ways to overcome these mechanisms.

The actual revenue lost by legitimate corporations is difficult to estimate. Similar issues exist in the anti-counterfeiting sector insofar as it is nearly impossible to determine the return on investment from an anti-counterfeiting technology. Conventional solutions focus either on customer engagement or security. Most commercially available security features require laboratory analysis or the use of proprietary scanning equipment for detection, which are only accessible to brand investigators and law enforcement officials.

SUMMARY

In accordance with an aspect of the specification, there is provided a method of product authentication. The method involves generating a plurality of nanoparticles in a reaction chamber. In addition, the method involves isolating fluorescent nanoparticles from the plurality of nanoparticles. The fluorescent nanoparticles have a peak fluorescence wavelength associated with a peak emission wavelength of a light source. Furthermore, the method involves embedding the fluorescent nanoparticles in a resin. The method also involves applying the resin on a product.

The method may further involve illuminating the resin on the product using the light source. The method may also involve measuring a fluorescent response to the light source.

The method may further involve performing colorimetric analysis on the fluorescent response.

The light source may be a light emitting diode.

The light source may include a plurality of light emitting diodes.

Each light emitting diode of the plurality of light emitting diodes may emit light having a different peak emission wavelength.

The method may further involve adding pigment to the resin to form an ink.

The resin may be clear to form a clear coat on the product.

Applying the resin may involve applying the resin in a pattern.

The pattern may be a machine readable code.

Applying the resin may involve applying the resin proximate to an inherent reference point on the product.

In accordance with an aspect of the specification, there is provided a system for product authentication. The system includes a light source having a peak emission wavelength. In addition, the system includes fluorescent nanoparticles having a peak fluorescence wavelength associated with the peak emission wavelength. Furthermore, the system includes a detector for detecting a fluorescent response to the light source by the fluorescent nanoparticles. The system also includes a resin into which the fluorescent nanoparticles are embedded, the resin for applying on a product.

The system may further include a processor configured to perform colorimetric analysis on the fluorescent response.

The light source may be a light emitting diode.

The light source may include a plurality of light emitting diodes.

Each light emitting diode of the plurality of light emitting diodes may emit light having a different peak emission wavelength.

The system may further include an ink formed from the resin and the fluorescent nanoparticles.

The resin may be clear to form a clear coat on the product.

The resin may be applied on the product in a pattern.

The pattern may be a machine readable code.

In accordance with an aspect of the specification, there is provided a non-transitory computer readable medium encoded with codes. The codes are for directing a processor to activate a light source having a peak emission wavelength. In addition, the codes are for directing the processor to receive image data from a detector configure to detect a fluorescence response to the light source by fluorescent nanoparticles. The fluorescence response has a peak fluorescence wavelength associated with the peak emission wavelength. Furthermore, the codes are for directing the processor to apply a saturation mask to the image data. The codes are also for directing the processor to perform colorimetric analysis to determine the peak fluorescence wavelength in the fluorescence response.

The light source may be a light emitting diode.

BRIEF DESCRIPTION OF THE DRAWINGS

Reference will now be made, by way of example only, to the accompanying drawings in which.

DETAILED DESCRIPTION OF THE EMBODIMENTS

Figure 1A:
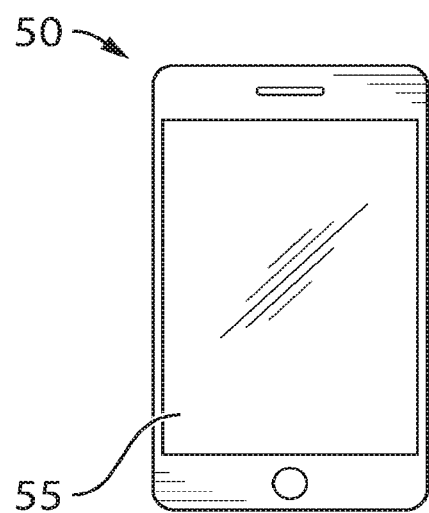
FIG. 1 is (a) a schematic representation of the front of a device in accordance with an embodiment; and (b) a schematic representation of the back of the device.

Described herein are methods, systems and devices for product authentication and customer engagement. In some examples of the methods, systems and devices, a mark, such as a security mark, is applied to a product or a product package. The mark includes an optically responsive material formulation, which can be detected by the device to determine authenticity of the product. The optical response generated by the mark ultimately depends on the device being used for authentication. The device can be any type of computing device capable of eliciting and measuring the optical response, such as a fluorescent response. It is to be appreciated that, in general, the device includes programming instructions in the form of codes stored on a computer readable medium for performing the functions, such as in the form of a downloadable application. For example, the device can be any one of a personal computer, a laptop computer, a portable electronic device, a gaming device, a mobile computing device, a portable computing device, a tablet computing device, a personal digital assistant, a cell phone, a smart phone or the like. In an embodiment, the device is a mobile computing device, such as a smartphone, having a single light source, such as a light emitting diode or a plurality of light emitting diodes in close proximity.

The materials that are contained within the mark are generally configured to be excited by light at around a peak absorption wavelength and emit light around a peak emission wavelength. The peak emission wavelength and/or the pattern of the mark can be collected and analyzed to determine authenticity of a product. It is to be appreciated by a person of skill in the art with the benefit of this description that the authentication process is not particularly limited. For example, the peak emission wavelength of the mark can be extracted from the image and converted into a hex code or red-green-blue (RGB) code. Subsequently, the extracted code can be cross referenced with a database that contains a library of codes pertaining to authentic products. Furthermore, the mark can be applied in a variety of different patterns. Each pattern can correspond to a particular color code that in turn corresponds to a specific peak emission wavelength of the material. As an example, the pattern of the mark can be used to obtain the corresponding color code from a secure online database. If that color code matches the peak emission wavelength of the material, the product can be deemed to be authentic.

In another embodiment, the mark may also be exposed to multiple light sources, each having a different peak emission wavelength (i.e. color). It is to be appreciated by a person of skill in the art that the light sources are not particularly limited. In some embodiments, the light sources can be in the form of a plurality of individual light sources or a single broadband light source combined with a monochromator. When exposed to the different wavelengths of light, the mark can emit light near one or more peak fluorescence wavelengths depending on the wavelength of the light source. It is to be appreciated that in some embodiments, multiple peak fluorescence wavelengths can be provided such that they form a unique fluorescence spectrum associated with the plurality of light sources. The dependence of the peak fluorescence wavelengths on the wavelength of the light source provides a secure method that results in a feature that is very difficult to duplicate, since most fluorescent and phosphorescent materials are excitation independent. Accordingly, it is to be appreciated by a person of skill in the art with the benefit of this description that the fluorescence spectrum can be customized for each product, such that every product has a unique identifier.

A user interface (UI) associated with the device and/or the optical scanner is also provided. The user interface can be used to guide users through the authentication process, display product information, and communicate promotional offers or exclusive marketing content as part of a customer engagement platform. The device and/or the optical scanner can also be loaded with software. The software can direct the device to extract unique identifiers from an image or a fluorescence spectrum, which can then be used to determine authenticity. Furthermore, it is to be appreciated that the device and/or the optical scanner may have the ability to connect remotely to a wireless network and access a secure online database containing a library of different identifiers that pertain to legitimate products.

The mark is not particularly limited and can be in the form of a machine-readable code, such as a barcode, in order to transmit information about a specific product in some embodiments. Accordingly, different types of devices can be used to verify the authenticity of the mark as long as each device can read the machine-readable code. This would enable the selective dissemination of product information. Therefore, brand/IP owners can control access to certain product information. Since the fluorescence spectrum can represent a secure feature and requires sophisticated detection equipment, it can also be used to communicate confidential or sensitive information about the product, and update product information as part of a track and trace program. It is to be appreciated that the manner by which the confidential and sensitive information is communicated is not particularly limited. For example, the mark itself may contain the information in a format readable by the detection equipment. Alternatively, the mark can be used as a key to obtain access to the confidential information from a secure database. Furthermore, a device having a single light source, such as a typical smartphone may only be able to observe product information whereas a sophisticated optical scanner with multiple proprietary light sources may be authorized to change said information. The systems presented herein can also require the user to log in or register an account, which can be another method of controlling access to product information via secure databases.

Figure 1B:
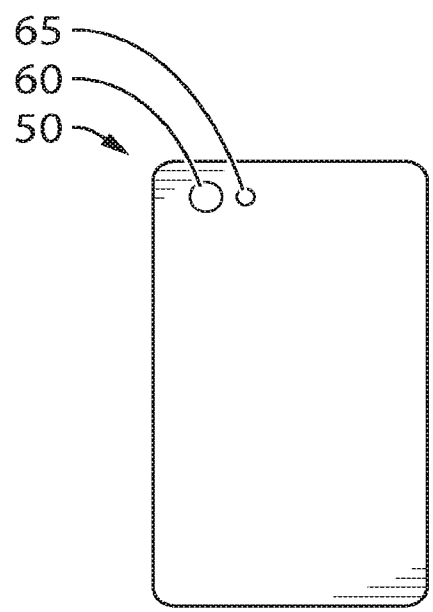

Referring to FIGS. 1a and 1b a device 50 is generally shown. In the present embodiment, the device 50 is a portable electronic device, such as a smartphone. The device 50 includes a display 55, a camera 60 and a light source 65. The light source 65 is not particularly limited. In the present embodiment, the light source 65 is a light emitting diode having a peak emission wavelength. However, in other embodiments, the light source 65 can be another source such as a laser or arc lamp or incandescent light. It is to be appreciated by a person of skill in the art that the device 50 further includes a computer readable medium (not shown) that can be used to store programming instructions and other data. The programming instructions are generally configured to direct a processor of the device 50 to perform various functions such running an operating system to control the display 55, the camera 60, and the light source 65. In particular, the display 55 can be a touch screen display for providing a user interface for the authentication process.

Figure 2A:
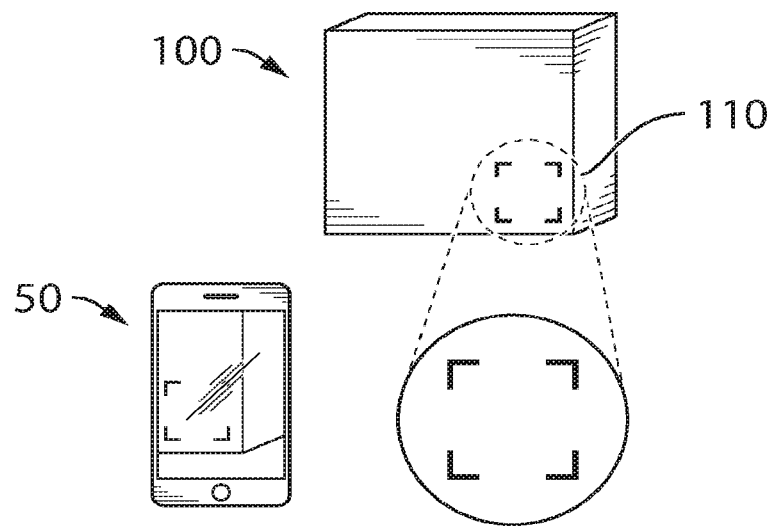
FIG. 2 is (a) a schematic representation of the device of FIG. 1 in operation; and (b) another schematic representation of the device of FIG. 1 in operation.
Figure 2B:
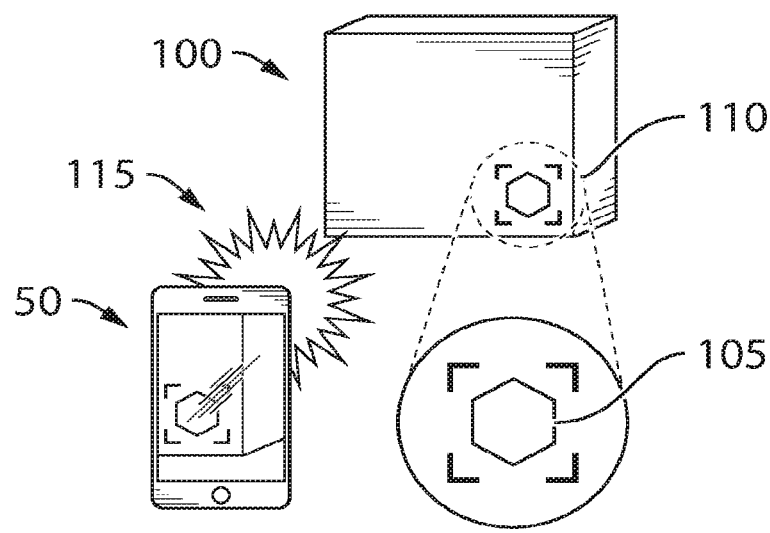

FIGS. 2a and 2b show the device 50 in use to authenticate a product 100. The product 100 is not particularly limited and can be any product or container to be authenticated. In the present embodiment, the product 100 is a package. The product 10 includes a mark 105 that is not clearly visible to the human eye. For example, the mark 105 can be formed by the application of ink on the product. In this embodiment, the ink can be clear and provide a mark or pattern on the product 100 not visible to the naked eye under normal ambient conditions. The location of the mark 105 is indicated by a target 110 on the product 100 and is present for the identification of the location of the mark 105. In other embodiments, the target 110 may not be present. In the present embodiment, the camera 60 of the device 50 is used to capture an image of the target 110. In order to capture the image of the target mark, the light source 65 is activated when the image is captured. The light source 65 exposes the product 100 to a burst of light 115 to reveal the mark 105 to the camera 60.

In the present embodiment, the mark 105 includes at least one fluorescent material. In some embodiments, the light source 65 is used to elicit a fluorescent response from the mark 105. In the present embodiment, the light source 65 includes a yellow peak and a blue peak that appear to be a white light emitting diode flash to the naked human eye. The light source 65 excites the fluorescent material contained within the mark 105. In an example, the fluorescent material can have an absorption spectrum that overlaps with the emission spectrum of the light source 65. In other embodiments, the fluorescent material can emit several different wavelengths of light when excited. The combination of wavelengths emitted from the mark 105 generates a single color. In further embodiments, the fluorescent material can possess an emission spectrum that overlaps with the visible spectrum, such that the color emitted from the mark 105 can be detected using the camera 60. The emission color and the pattern of the mark 105 recorded by the camera 60 can be collectively analyzed to determine authenticity.

In the event that the product 100 is determined to be authentic, the device 50 can provide an indication that the product 100 is authentic. The manner by which the indication is provided is not particularly limited. For example, in the present embodiment, the mark 105 comprises a symbol. However, it is to be appreciated by a person of skill in the art that variations of the mark 105 are contemplated, such as a machine readable code, a logo, or a signature. The use of machine readable codes enables the device 50 to extract information about the product 100. The device 50 can also be used to update information about the product 100 as part of a track and trace platform. The extent to which the device 50 is provided access to product information and the ability of the device 50 to update said information may be determined by the identity of the user of the device 50. The manner by which an identity is determined is not particularly limited. For example, identification can be done using biometric analysis (i.e. fingerprint, retinal scan, voice recognition etc.) or through the input of a password.

Figure 3A:
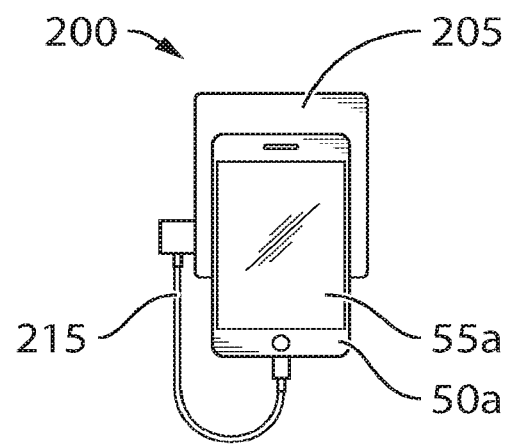
FIG. 3 is (a) a schematic representation of the front of a system in accordance with an embodiment; and (b) a schematic representation of the back of the system.
Figure 3B:
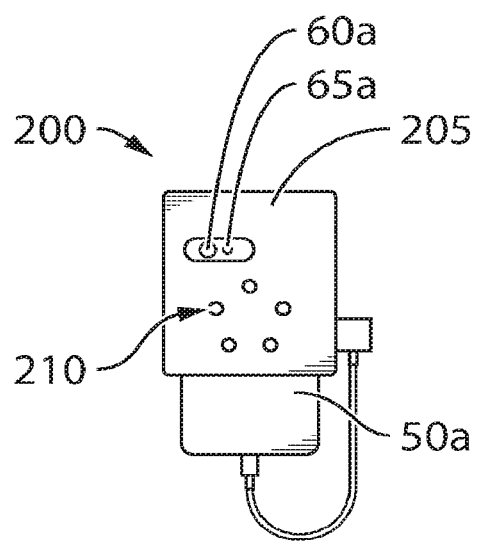

Referring to FIGS. 3*a* and 3*b*, a system 200 in use to authenticate products in accordance with another embodiment is generally shown. The system 200 includes a device 50*a*, such as a smartphone, attached to a light source 205. It is to be appreciated by a person of skill in the art with the benefit of this description that the device 50*a* can be similar or identical to the device 50 described above; however, the device 50*a* is not particularly limited. For example, the device 50*a* can be any one of a personal computer, a laptop computer, a portable electronic device, a gaming device, a mobile computing device, a portable computing device, a tablet computing device, a personal digital assistant, a cell phone or the like. Although the light source 205 is shown as a separate component attached to the device 50*a*, it is to be understood that a variety of different forms are contemplated. In the present embodiment, the device 50*a* includes camera 60*a* and an optional light source 65*a*. In the present embodiment, the light source 205 is in communication with the device 50*a* and includes a series of light emitting diodes 210 located on the rear of the light source 205 as shown in FIG. 3*b*. In the present embodiment, each of the light emitting diodes 210 emits light having varying peak emission wavelengths (i.e. a different color of light). The light emitting diodes 210 on the light source 205 are connected to the device 50*a* to provide power using the internal power source of the device 50. In this example, the light source 205 is connected to the device 50 via a USB cable. In other embodiments, the light source 205 can be connected to the device 50*a* using a lightning port, or wirelessly using Bluetooth communication channels, or any other suitable port. Accordingly, it is to be appreciated by a person of skill in the art with the benefit of this description that the light emitting diodes 210 on the light source 205 can also be powered using an external power source, such as a battery pack.

Figure 4A:
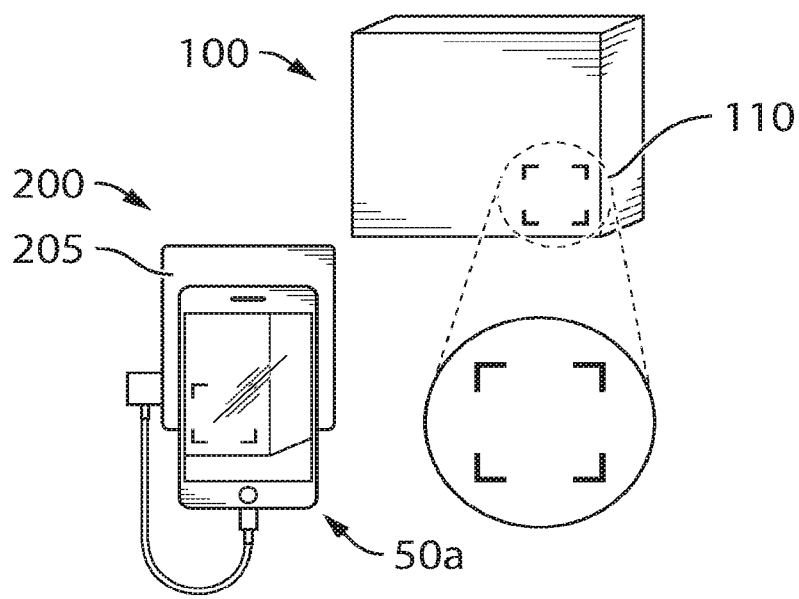
FIG. 4 is (a) a schematic representation of the system of FIG. 3 in operation; and (b) another schematic representation of the system of FIG. 3 in operation.
Figure 4B:
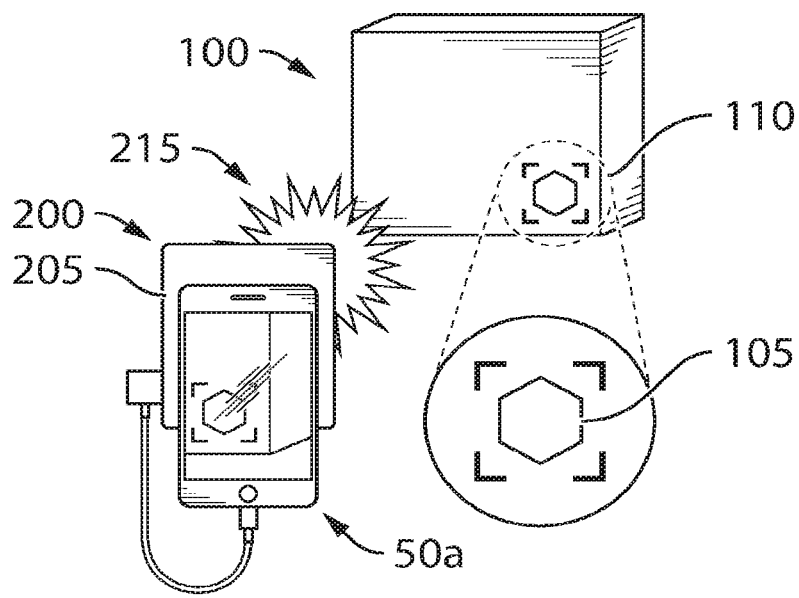

FIGS. 4*a* and 4*b* show the system 200 in use to authenticate the product 100. In the present embodiment, the camera 60*a* of the device 50*a* is used to capture an image of the target 110. In order to capture the image of the mark 105, the light source 205 is activated to illuminate the target 110. The light source 205 exposes the target 110 to a burst of light 215. The device 50*a* and light source 205 are used to authenticate the product 100. In the present embodiment, the camera 60*a* is used to capture an image of the mark 105 when exposed to different sources of light. In the present embodiment, the light source 65*a* on the device 50*a* and the series of light emitting diodes 210 located on the light source 205 can be activated in sequence as bursts of light 215 being emitted from the rear of the light source 205. The camera 60*a* can then capture images of the mark 105 under different conditions, such as different light sources with different emission spectra. In addition, it is to be appreciated that the camera 60*a* can also capture an image using the ambient light without a burst of light 215 to provide additional information.

As shown in FIG. 3*b*, there are five light emitting diodes 210 and a white light source 65*a* in the present embodiment. By activating the light emitting diodes 210 and the light source 65*a* one after the other, the camera 60*a* will capture six images of the mark 105. It is to be appreciated that the sequence by which the light emitting diodes 210 and the light source 65*a* are activated is not particularly limited and that any sequence can be used as a substitute. Upon the activation of a light emitting diode or other light source, the mark 105 or a portion of the mark 105 can be revealed and may become visible to the human eye and/or detectable by the camera 60*a*. It is to be appreciated by a person of skill in the art with the benefit of this description that the mark 105 is not particularly limited. In the present example, the mark 105 comprises a symbol. In other embodiments, different shapes, orientation, and/or structures for the mark 105 can be substituted, such as a machine readable code, a logo, or a signature. The mark 105 comprises a material formulation that fluoresces when exposed to a light source. The material formulation provides a fluorescent response that may change depending on the excitation source. The fluorescent responses elicited by different excitation sources may be used to generate a unique product identifier. Those with skill in the art and the benefit of this description will recognize the advantages associated with an excitation dependent fluorescent response and the ability to create unique product identifiers. Furthermore, it is to be appreciated that the mark 105 can include more than one material formulation and provide different responses for each of the light emitting diodes 210 and the light source 65a. Therefore, the material formulations can be used as another verification to provide a multi-factor authentication.

For example, exposing the mark 105 to the light source 65a can provide a first image based on a material formulation having a peak fluorescence wavelength associated with a peak emission wavelength of the light source 65a. Both the peak fluorescence wavelength and the pattern of the mark 105 can be used to determine authenticity. Upon determining whether the product 100 is authentic, the device 50a can display an icon on the display 55a to communicate a positive or negative response.

It is to be appreciated that that material formulation is not particularly limited. For example, the material formulation can include a noble metal. In other embodiments, the noble metal can include gold or silver. In some embodiments, the noble metal is in the form of particulate spheres, cylinders, ovals, cubes, rectangular prisms, triangular prisms, pyramids, cones, octahedrons, dodecahedrons, or any combination thereof. In some embodiments, the noble metal is in the form of particulate spheres with particle diameters in the range of 0.1 nm to 100 nm. In some embodiments, the noble metal is in the form of a thin film. In some embodiments, the thickness of the noble metal film is in the range of 1 nm to 10 μm. In other embodiments, the material formulation can include quantum dots. In some embodiments, the diameters of the quantum dots are in the range of 0.1 nm to 100 nm. In some embodiments, the composition of the quantum dots comprises cadmium, selenium, lead, sulfur, arsenic, phosphorus, indium, zinc, silicon, tellurium, oxygen, or any combination thereof. As another example, the material formulation can include an organic material organic material comprises a molecule, pigment, polymer, or combination thereof. In some embodiments, the organic material can include a dye. The dye is not particularly limited and may include xanthenes, cyanines, squaraines, napthalenes, coumarins, oxadiazoles, anthracenes, pyrenes, oxazines, acridines, arylmethines, tetrapyrroles, green fluorescent proteins, FMN-binding fluorescent proteins, small ultra red fluorescent proteins, any combination or derivative of. The dye may also include commercial dies, such as CF Dyes, DRAQ, CyTRAK, BODIPY, Alexa Fluor, DyLightFLuor, Atto, Tracy, FluoProbes, Abberior Dyes, DY, MegaStokes Dyes, Sulfo Cy Dyes, HiLyte Fluor, Seta, SeTau, Square Dyes, Quasar, Cal Fluor dyes, Surelight Dyes, APC, APCXL, RPE, BPE, Vio Dyes, or any combination or derivative of.

In other embodiments, the material formulation can be functionalized through the addition of chemical groups. The chemical groups may comprise amines, amides, arenes, alcohols, alkanes, alkenes, alkynes, benzenes, halides, epoxides, ketones, aldehydes, acyl halides, esters, acid anhydrides, peroxides, acetals, hemiacetals, orthoesters, ethers, imines, imides, azides, cyanates, nitrates, nitriles, nitrites, nitro groups, nitroso groups, oximes, pyridines, carboxylic acids, thiols, sulphides, disulphides, sulfoxides, sulfones, sulphinic acids, sulphonic acids, thiocyanates, thioketones, thials, phosphines, phosphonic acids, phosphates, boronic acids, boronic esters, borinic acids, borinic esters, selenols, selenoaldehydes, selenoketones, selenides, diselenides, selenoxides, selenones, seleninic acids, selenenic acids, selenyl halides, anilines, silanols, siloxides, siloxanes, silyl ethers, silyl halides, or any combination or derivative thereof. In further embodiments, the material formulation can also be functionalized through interactions with metal ions. The metal ions may comprise ions of gold, silver, magnesium, erbium, cobalt, iron, nickel, platinum, or any combination or derivative thereof.

Additionally, the material formulation can include the organic material such as carbonaceous particles. In some embodiments, the diameters of the carbonaceous particles are in the range of 0.1 nm to 100 nm. In some embodiments, the carbonaceous particles are functionalized through the addition of chemical groups. The chemical groups may comprise those discussed above. In some embodiments, the carbonaceous particles are functionalized through interactions with metal ions, which may comprise ions of gold, silver, magnesium, erbium, cobalt, iron, nickel, platinum, or any combination or derivative thereof. The material formulation may also have other characteristics such as luminescent: photoluminescence, chemiluminescence, electroluminescence, mechanoluminescence, thermoluminescence, or any combination thereof.

Additionally, exposing the mark 105 to each of the light emitting diodes 210 can provide other peak fluorescence wavelengths (i.e. colors) emitted from the mark 105. The additional peak fluorescence wavelengths can result from the different peak emission wavelengths of each of the light emitting diodes 210. The mechanism by which the additional peak fluorescence wavelengths are provided is not particularly limited. For example, a material formulation can provide different responses to light of varying wavelengths. As another example, multiple material formulations can be used in the mark 105 where each of the light emitting diodes 210 can excite a different material formulation while the remaining formulations are not responsive.

The manner by which the images captured are analyzed is not particularly limited. In the present embodiment, each image is analyzed by the software and mapped onto the red-blue-green (RGB) color space. The analysis can also include a feature finding algorithm to locate the mark 105 on a product 100. In addition, the analysis can use binning the data based on value, advanced statistics and histograms to identify the mark 105. The corresponding RGB code can be converted to hex format. The data acquired from these images is compiled in order to generate a unique identifier associated with the mark 105.

In other embodiments, the unique identifier will include multiple hex codes. Each of the hex codes can be calculated from an image by plotting the results as a Kronecker delta function. The pattern of lines generated by the plot can be used as the unique product identifier.

It is to be appreciated by a person of skill in the art with the benefit of this description that the system 200 can also be used to track and trace the product 100 as it is distributed throughout a supply chain. In this regard, the authentication process can be used to delineate different events in the supply chain. For example, the color emitted from the mark 105 when exposed to the light source 65a can be used by consumers to access product information. This form of authentication does not require the additional light source 205, which precludes the need for consumers to obtain additional hardware. Alternatively, a supply chain user can use the light source 205 to update product information by verifying the fluorescent response of the mark 105 to provide additional security measures that would preclude a consumer from updating this information.

Figure 5:
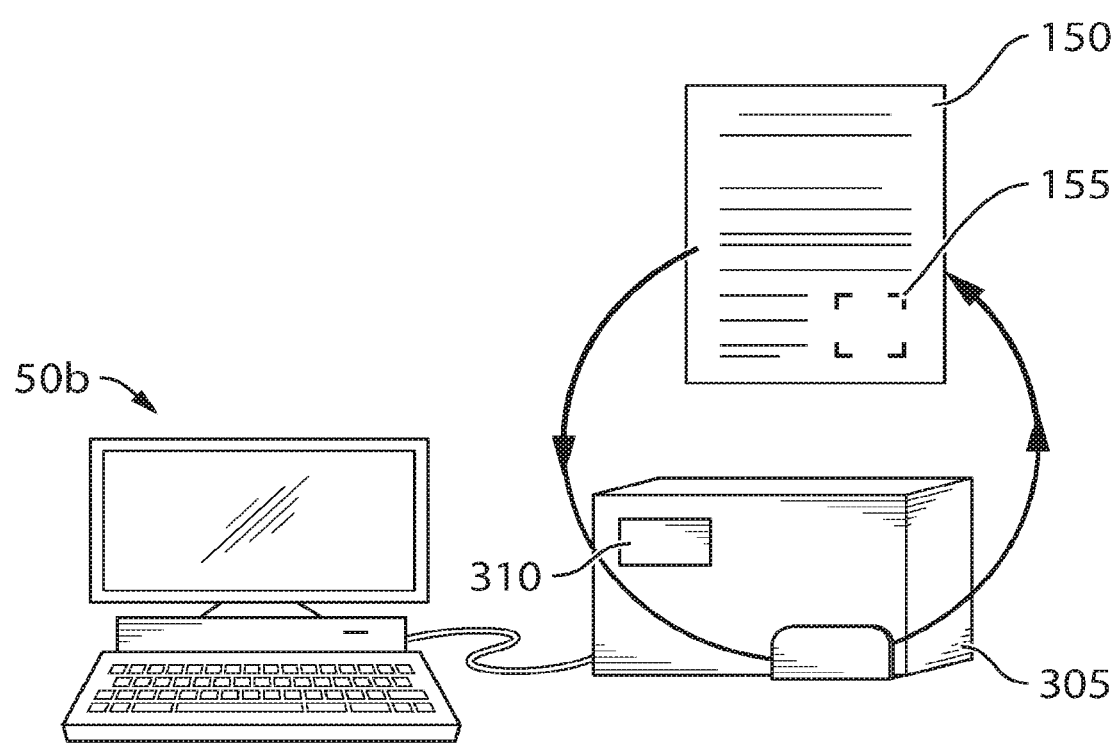
FIG. 5 is a schematic representation of a device in accordance with another embodiment.

FIGS. 5a and 5b generally show system 300 for product authentication in accordance with another embodiment. The system 300 involves the use of a device 50b that is connected to a scanner 305. In the present embodiment, the device 50*b* is a laptop computer. However, it is to be appreciated by those skilled in the art that other computing devices such as a desktop computer, tablet, or smartphone can be substituted. In the present embodiment, the device 50*b* includes a computer readable medium encoded with codes and/or programming instructions to facilitate an authentication process as well as verify the identity of the user. In this embodiment, the device 50*b* requires a login procedure such as in using an alphanumeric password before the software authorizes the authentication. In the present embodiment, the scanner 305 includes an optional display 310 that can be used to render output that indicates the status of the authentication. The product 150 is inserted into the scanner 305 to begin authentication. In the present embodiment, the product 150 is a document having an invisible mark in the target 155. It is to be appreciated that the target 155 is optional and may not be included in other embodiments. The scanner 305 operates in a similar fashion to a solid state fluorimeter where the product 150 can be exposed to a series of excitation wavelengths. The emission profile acquired from each excitation wavelength can be compiled to generate a unique product identifier.

The scanner 305 is not particularly limited and can include any device configured to scan images of documents using different excitation wavelengths. The manner by which the excitation wavelengths are generated is not particularly limited and can include using different light sources. For example, the scanner can include a xenon arc lamp, two monochromators, and a photodetector in the present embodiment. During the authentication scan, the xenon arc lamp is activated and the emitted light is transmitted through the first monochromator, which exposes the mark to a particular wavelength of light. The fluorescence emission from the mark is then transmitted through the second monochromator and onto the photodetector, which can include a charge coupled device (CCD) array. The position of the second monochromator is adjusted to emit wavelengths across a specific range. The measurements made by the photodetector as the position of the second monochromator is adjusted represent the emission profile for the corresponding excitation wavelength.

In the present embodiment, the device 50*b* is further capable of connecting to the internet and accessing a secure online database (not shown) that contains a library of identifiers associated with authentic products. The device 50*b* can cross reference the identifier obtained from the authentication scan with the library of identifiers from the online database to determine authenticity. In other embodiments, the system 300 may be used as part of an encryption scheme. For example, the compiled emission profiles may collectively represent an encryption key. The encryption key may be used to decode information corresponding to the product. In the context of the system 300, the encryption key can be used to decode the information contained in the product 150.

Figure 6:
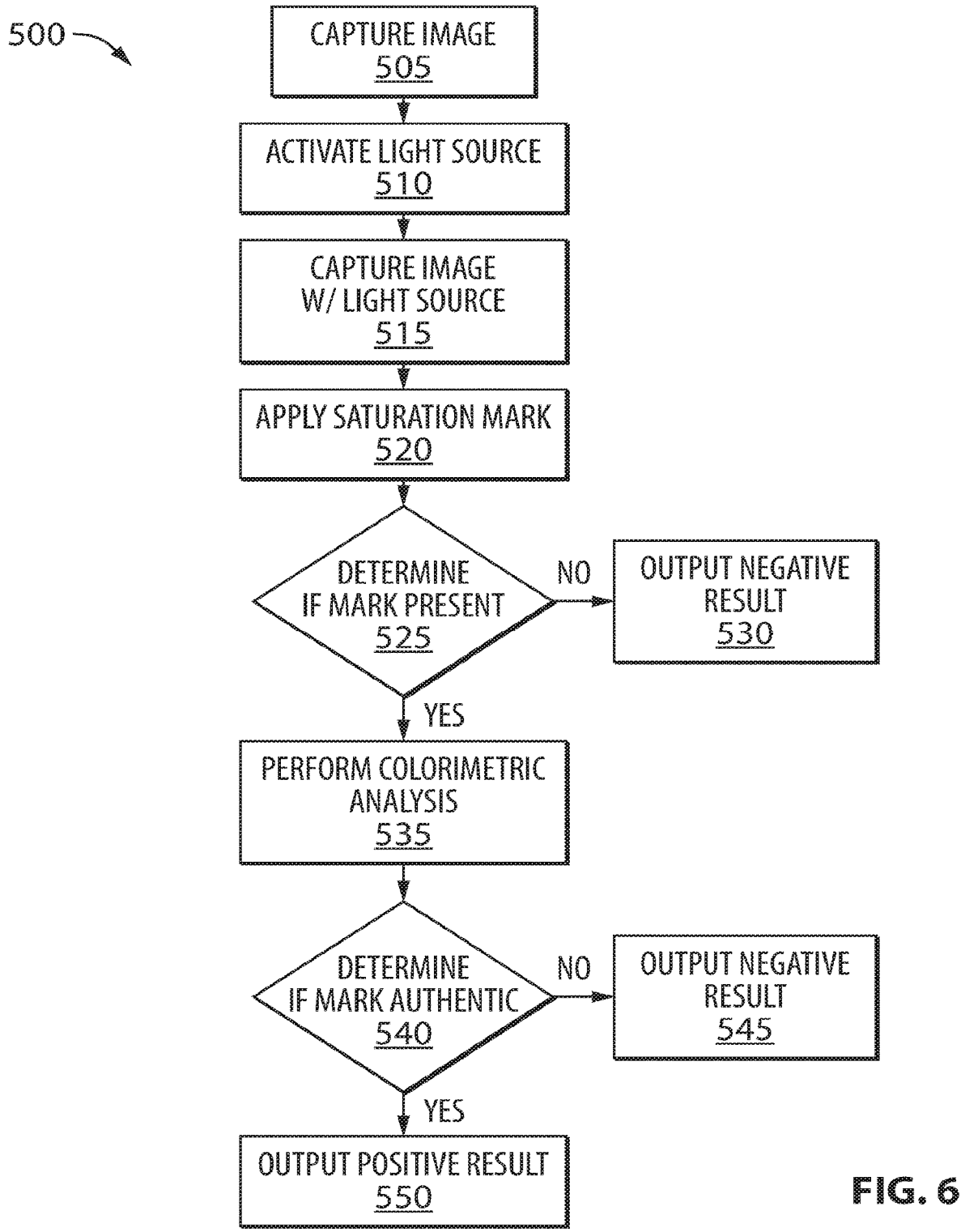
FIG. 6 is a flow chart of a method of authentication in accordance with an embodiment.

FIG. 6 is a method of authenticating a product is represented in the form of a flow-chart and indicated generally at 500. In order to assist in the explanation of the method 500, it will be assumed that the method 500 is performed using the system 200. Furthermore, the following discussion of the method 500 will lead to further understanding of the system 200 and its various components. In particular, it is to be understood that in one embodiment, the programming instructions of the device 50*a* direct a processor to carry out the methods discussed below. However, it is to be understood that the system 200 and/or the method 500 can be varied, and need not work exactly as discussed herein in conjunction with each other, and that such variations are within the scope of the present invention.

Block 505 involves capturing an image of the mark 105 in the absence of the excitation light source. In the present embodiment, the mark 105 is not visible to the naked eye without activation by a light source. Accordingly, in this example, the image captured in the block would be blank. Therefore, it is to be appreciated by a person of skill in the art with the benefit of this description that this block may be optional or omitted in some embodiments.

Block 510 involves activating a light source, such as one or more of the light emitting diodes 210 and the light source 65*a*. Next, block 515 involves capturing an image of the mark 105 using the camera 60*a* when exposed to the excitation light.

The two images captured during the execution of blocks 505 and 510 are then subjected to block 520, which involves the application of a saturation mask to extract the mark 105. Prior to the application of the saturation mask, the images obtained by the execution of blocks 505 and 515 can be pre-processed for the saturation mask. For example, the images can be de-noised through the application of a Gaussian filter, a median filter, or another filter. The filtered image can then be processed using image recognition algorithms to locate visible features in the image through feature matching or via thresholding to point to specific regions that have been printed with a machine readable pattern. The application of the saturation mask is not particularly limited and can include a single-channel or multi-channel mask from a color space. The data obtained after the application of the mask can then be de-convoluted via averaging over a given dimension, binning the data based on value, advanced statistics, or histogram analysis.

It is to be appreciated by a person of skill in the art that the application of a saturation mask can be optional and used only for images where the mark is not readily visible. If the image captured at block 515 clearly shows the mark 105, the application of the saturation mask may be omitted. Furthermore, a variety of color space isolation methods can be used as a substitution, such as a hue mask or is a single channel or multi-channel mask using any combination of RGB, CYMK, HSV, HLS, YCrCb, CIE-XYZ, CIE-Lab or Clu-Luv colorspaces.

Furthermore, it is to be appreciated by a person of skill in the art that the image captured at block 505 can provide an additional verification step to detect fraudulent marks. In particular, since there is no significant fluorescence in the absence of the excitation light, the mark 105 remains undetectable in the image from block 505. If the mark 105 is notable in the image from block 505, it indicates that the mark 105 is fraudulent.

Block 525 comprises making a determination of whether the mark 105 is present in the image from block 515. The manner by which this is accomplished is not particularly limited and can include analyzing the results from the execution of block 520. If the mark 105 is not present, the system 200 generates output indicating that the product is not authentic. In an example of an authentic product, the image from block 515 exhibits a substantial color change where the mark 105 is present, to enable the identification of the pixels that to be used for subsequent processing and the method 500 continues to block 535. Alternatively, if there is no significant or continuous variation in color across different pixels, the system 200 determines that a security mark is not present and the method 500 proceeds to block 530 where the system 200 renders output of a negative result indicating that the product 100 is not authentic.

Block 535 involves performing colorimetric analysis on the fluorescence response by analyzing the detected fluorescence spectrum from the mark 105 to determine a hex code. The color of each pixel identified in block 520 is converted into hex code and cross referenced the expected value of a mark provided by the manufacturer of the product 100. In the present embodiment, the hex code is cross reference with a secure online database that contains the hex codes associated with authentic products. However, in other embodiments, the database can be stored locally. If there is a positive match, the method 500 proceeds to block 550 where the system outputs a positive result confirming authenticity. Alternatively, if the hex code does not match the expected values, the method 500 proceeds to block 545 where the system 200 renders output of a negative result indicating that the product 100 is not authentic Variations are contemplated. For example, in other embodiments, the software may also use the online database to match the pattern of the mark to the hex code. In addition, a combination of different patterns and fluorescence spectra can be used to provide each product with a unique identifier. By matching these two characteristics, the system 200 can determine what product the user is authenticating and communicate information relating to that specific product.

Figure 7:
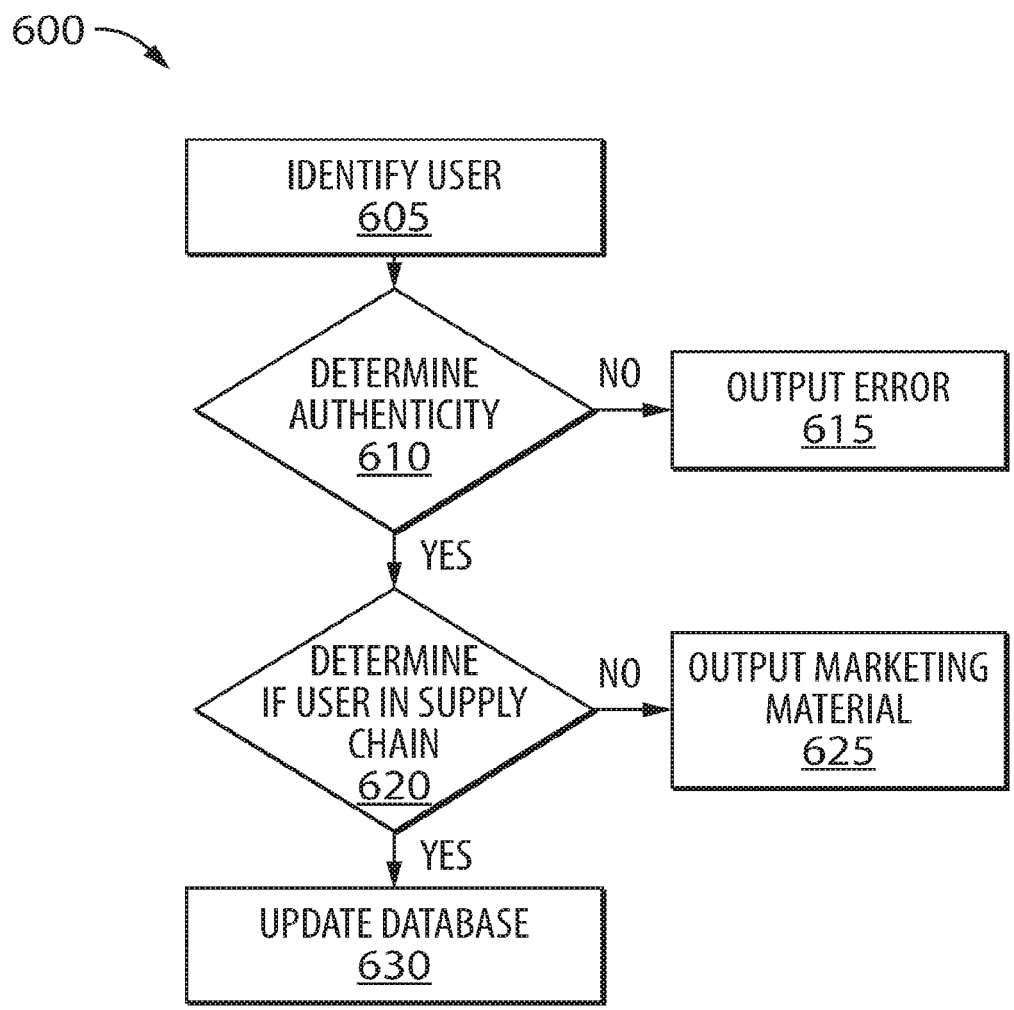
FIG. 7 is a flow chart of a method of authentication in accordance with another embodiment.

Referring to FIG. 7, another method of authentication is represented in the form of a flow-chart and indicated generally at 600. In order to assist in the explanation of the method 600, it will be assumed that the method 600 is performed using the system 200. Furthermore, the following discussion of the method 600 will lead to further understanding of the system 200 and its various components. Furthermore, it is to be emphasized, that method 600 need not be performed in the exact sequence as shown and that various blocks can be performed in parallel rather than in sequence; hence the elements of the method 600 are referred to herein as "blocks" rather than "steps". In particular, it is to be appreciated that block 605 and block 610 can be switched or carried out simultaneously.

Beginning at block 605, a user verifies their identity. The manner by which the verification is carried out is not particularly limited. In the present embodiment, the system uses a fingerprint analysis. For example, the device 50a can be a smartphone are equipped with the ability to detect fingerprints. If the user is a consumer, they may be required to create an account in order to become authorized. If the user does not have the proper authorization, the software may prompt the user to create an account or provide personal information.

Once the user is identified, block 610 involves determining the authenticity of the mark 105. The manner by which authenticity is determined is not particularly limited and can involve capturing an image of the mark 105 with and without the excitation light source similar to the method described in the method 500. If the product 100 is determined to be not authentic, the method 600 proceeds to block 615 where the system 200 outputs an error or that the product is not authentic.

Alternatively, if the product 100 is determined to be authentic, the system 200 proceeds to block 620 to determine if the user is in the supply chain. The manner by which this determination is made is not particularly limited. In the present embodiment, the system uses the information obtained at block 605 to discriminate users based on their role in the supply chain. If the user is a consumer, the method proceeds to block 625 where the system 200 outputs information that constitutes marketing material. This information may include, but is not limited to, the origin, history, composition, or contents of the product.

If the user is determined to be a supply chain personnel at block 620, the method 600 proceeds to block 630 where the system 200 enables the user to update information about the product 100 as part of a track and trace regime. Users that pertain to this category may also have access to the updates made by other supply chain personnel. In some embodiments, the supply chain personnel may be able to link the mark 105 from a previous shipment to a new mark. This feature is useful for products that are processed or repackaged at certain points along a supply chain. Accordingly, these "middleman" facilities can authenticate the shipment upon arrival and package the final product with a new mark. Authorized personnel can then link the two marks together. This process may be used to verify that there has been no dilution, substitution, or adulteration.

In the embodiments discussed above, the mark 105 is generally not visible to the naked eye under ambient conditions because of the reduced light intensity. When exposed to the concentrated burst of light, the intensity is sufficient to elicit a fluorescent response from the mark 105 that can be detected by the authentication device and that may be visible to the human eye. The mark 105 may be applied as an ink using digital printing techniques. In the present embodiment, the ink includes a resin and a plurality of fluorescent nanoparticles. In some embodiments, the ink can further include pigments, surfactants, solvents, polymers, and fillers. The mark 105 can be printed on the product directly or on the product packaging. The material formulation that generates the fluorescent response may comprise a mixture of nanoparticles. It is to be appreciated by a person of skill in the art with the benefit of this description that the use of nanoparticles provides a material formulation that can be engineered accurately to achieve a desired fluorescence response to light. By changing fundamental physical and chemical properties of the nanoparticles, such as the size, surface chemistry, and material composition the fluorescent response may be coupled efficiently to the output spectrum from the excitation light source. In addition, nanoparticles are typically more resistant to photobleaching and provide longer durability over conventional alternatives.

Furthermore, the nanoparticle formulation can also exhibit a fluorescent response that changes in response to different stimuli. In some embodiments, a single type of nanoparticle may be used, which exhibits a fluorescent response that changes when exposed to different excitation light sources. In other embodiments, the fluorescent response changes when the mark is exposed to chemical reagents. These reagents may include, but are not limited to, water, ethanol, acetone, dimethylformamide, acetic acid, sodium bicarbonate, sodium hydroxide, sodium borohydride, hydrogen peroxide, potassium permanganate, or sodium persulfate. In the present embodiment, these reagents may be applied by spraying as a liquid solution onto the mark in order to provide a second point of authentication wherein the first point of authentication occurred in the absence of the reagent. In other embodiments, the reagents can be applied using other means such as stamping or dispending from a pen.

Figure 8:
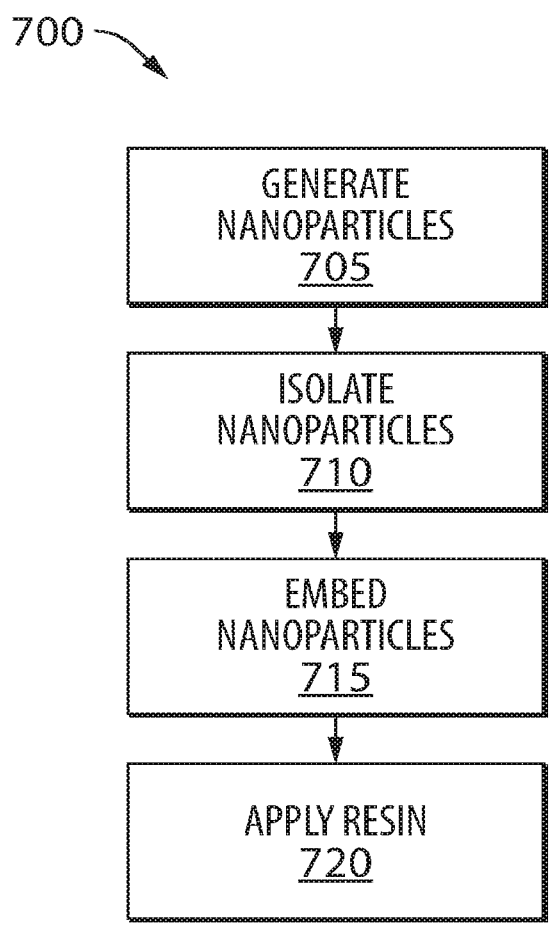
FIG. 8 is a flow chart of a method of manufacturing a mark in accordance with an embodiment.

Referring to FIG. 8, another method of authentication is represented in the form of a flow-chart and indicated generally at 700. Beginning at block 705, nanoparticles are generated. The manner by which the nanoparticles are obtained is not particularly limited. For example, in the present embodiment, the nanoparticles are generated in a reaction chamber.

At block 710, the nanoparticles are isolated in accordance with a characteristic. In particular, the nanoparticles are isolated and classified in accordance with their peak fluorescence wavelength associates with a peak emission wavelength of the light source. In the present embodiment, the reactions generating the nanoparticles can provide multiple types of nanoparticles which can then be isolated such that nanoparticles having a desired peak fluorescence wavelength response to a peak emission wavelength is obtained.

Next, block 715 involves embedding nanoparticles isolated at block 710 into a resin to form an ink for printing. The manner by which the nanoparticles are embedded is not particularly limited. In the present embodiment, the nanoparticles are simply mixed with the resin. The resin is also not particularly limited and can be varied depending on the intended application, such as surface, to which the ink would be printed. In other embodiments, the nanoparticles can be encapsulated by a polymer such as polyester, polystyrene, polyethylene, polyurethane, polypropylene, polyvinyl chloride, polytetrafluoroethylene, polyamide, polyethylene terephthalate, or any combination or derivative thereof.

After the nanoparticles are embedded in the resin, the resin is applied to the product 100 at block 720. The manner by which the resin is applied is not particularly limited and can in various printing techniques. For example, the resin can be applied using flexographic, offset, gravure, or digital printing. Accordingly, the applied resin become the mark 105 on the product.

Various advantages will now be apparent to a person of skill in the art. Of note is that the embodiments described above are useful for applications where counterfeiters are known to be highly skilled. Under these conditions, the counterfeiter may have sufficient resources to duplicate a mark on a package. However, it is very unlikely a hacker will be able to duplicate the fluorescent response based on a specific emission spectrum. In other embodiments, the user may gain access to product information if the product 100 is deemed authentic. The information communicated to the user can also be customized depending on the user's identity to provide further streamlined use. Furthermore, by using a mark that simply requires a simple device such as a smartphone, additional hardware would not need to be purchased to implement this authentication method.

While specific embodiments have been described and illustrated, such embodiments should be considered illustrative only and should not serve to limit any future claims, such as the exemplary claims provided herein.

What is claimed is:

1. A system for product authentication, the system comprising:
    an imaging device for capturing image data of a machine-readable mark applied to a product; the machine-readable mark comprises an invisible authentication mark having a deterministic pattern formed by fluorescent nanoparticles overlying a visible authentication mark distinct from the invisible authentication mark;
    a light source associated with the imaging device selectively providing light to the product;
    a display; and
    a processor executing machine-readable instructions to:
        activate the light source;
        capture the image data from the imaging device;
        analyzing the deterministic pattern of the invisible authentication mark to determine emission profiles;
        determine an existence of a key based on the emission profiles of the invisible authentication mark;
        if the key exists, access confidential data based on at least the key; and
        otherwise, provide product information on the display.

2. The system of claim 1, wherein the access of confidential information comprises:
    updating a track and trace platform.

3. The system of claim 1, wherein the key comprises an encryption key.

4. The system of claim 1, wherein the access of confidential data is based on the key and an identify of a user of the system.

5. The system of claim 1, wherein the light comprises at least one peak emission wavelength associated with at least one fluorescence wavelength of the fluorescent nanoparticles.

6. The system of claim 5, wherein the light source comprises a plurality of light emitting diodes.

7. The system of claim 6, wherein each light emitting diode of the plurality of light emitting diodes emits the light having a different peak emission wavelength.

8. The system of claim 1, wherein the machine-readable mark is unique from other machine-readable marks applied to a plurality of other products.

9. The system of claim 1, wherein the product information is determined by the visible authentication mark.

10. A method of product authentication, the method comprises:
    generating a machine-readable mark on a product, the machine-readable mark comprises an invisible authentication mark having a deterministic pattern formed by fluorescent nanoparticles overlying a visible authentication mark distinct from the invisible authentication mark;
    activating a light source to provide light to the product;
    capturing image data of the machine-readable mark from an imaging device;
    analyzing the deterministic pattern of the invisible authentication mark to determine emission profiles;
    determining an existence of a key based on the emission profiles of the invisible authentication mark;
    if the key exists, accessing confidential data based on at least the key; and
    otherwise, providing product information on a display.

11. The method of claim 10, further comprises:
    updating a track and trace platform.

12. The method of claim 10, wherein the key comprises an encryption key.

13. The method of claim 10, wherein the accessing of confidential data is based on the key and an identity of a user.

14. The method of claim 10, wherein the light comprises at least one peak emission wavelength associated with at least one florescence wavelength of the fluorescent nanoparticles.

15. The method of claim 14, wherein the light source comprises a plurality of light emitting diodes.

16. The method of claim 15, wherein each light emitting diode of the plurality of light emitting diodes emits the light having a different peak emission wavelength.

17. The method of claim 10, wherein the machine-readable mark is unique from other machine-readable marks applied to a plurality of other products.

* * * * *